(12) United States Patent
Minta

(10) Patent No.: US 11,378,215 B2
(45) Date of Patent: Jul. 5, 2022

(54) APPARATUS FOR DUCT CONNECTION

(71) Applicant: Hamilton Sundstrand Corporation, Charlotte, NC (US)

(72) Inventor: Zbigniew Minta, Wrocław (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 207 days.

(21) Appl. No.: 16/693,484

(22) Filed: Nov. 25, 2019

(65) Prior Publication Data

US 2020/0248858 A1 Aug. 6, 2020

(30) Foreign Application Priority Data

Feb. 1, 2019 (EP) ..................................... 19461510

(51) Int. Cl.
| | |
|---|---|
| *F16L 23/04* | (2006.01) |
| *F16L 47/14* | (2006.01) |
| *F16L 17/025* | (2006.01) |
| *F16L 17/035* | (2006.01) |
| *F16L 58/18* | (2006.01) |

(52) U.S. Cl.
CPC ............. *F16L 47/14* (2013.01); *F16L 17/025* (2013.01); *F16L 17/035* (2013.01); *F16L 23/04* (2013.01); *F16L 58/187* (2013.01)

(58) Field of Classification Search
CPC ..... F16L 37/088; F16L 23/024; F16L 25/026; F16L 9/14; F16L 58/187; F16L 23/04; F16L 23/12; F16L 17/035; F16L 17/025; F16L 47/14; F16L 23/08
See application file for complete search history.

(56) References Cited

U.S. PATENT DOCUMENTS

| | | | |
|---|---|---|---|
| 2,766,518 | A | 10/1956 | Costanzo |
| 3,142,499 | A | 7/1964 | Lang |
| 4,613,163 | A | 9/1986 | Grosshandler |
| 4,715,739 | A | 12/1987 | Ruegg et al. |
| 5,573,282 | A | 11/1996 | Egner et al. |
| 6,715,800 | B1 | 4/2004 | Hennig |

(Continued)

FOREIGN PATENT DOCUMENTS

| | | | | |
|---|---|---|---|---|
| DE | 931325 | C  * | 8/1955 | ............ F16L 23/024 |
| DE | 2325910 | A1 * | 12/1974 | .............. F16L 23/08 |

(Continued)

OTHER PUBLICATIONS

Extended European Search Report for International Application No. 19461510.0 dated Jul. 12, 2019, 9 pages.

*Primary Examiner* — Matthew Troutman
*Assistant Examiner* — James A Linford
(74) *Attorney, Agent, or Firm* — Cantor Colburn LLP

(57) ABSTRACT

The present disclosure relates to an apparatus for connecting to the end of a duct, the apparatus comprising: an outer ring having a central axis (C) and an inner surface extending between a first axial end and a second axial end of the outer ring; and an inner ring positioned within the outer ring and having a central axis (C) and an outer surface extending between a first and second axial end of the inner ring. A gap is provided between the outer surface of the inner ring at its first end and the inner surface of the outer ring at its first end, the gap extending in the direction of the second ends of the inner and outer rings.

5 Claims, 4 Drawing Sheets

(56) References Cited

U.S. PATENT DOCUMENTS

2002/0041099 A1     4/2002    Grun
2014/0363220 A1    12/2014    Auer et al.
2017/0082221 A1     3/2017    Redondo Carracedo et al.

FOREIGN PATENT DOCUMENTS

| DE | 4130593 A1 * | 3/1993 | ............. F16L 23/22 |
| EP | 0059163 B1 | 9/1982 | |
| EP | 3012502 A1 * | 4/2016 | .......... F16L 25/0045 |
| FR | 547815 A * | 12/1922 | ............. F16L 23/08 |
| FR | 2260054 A1 * | 8/1975 | ............. F16L 23/08 |
| GB | 1021309 A | 3/1966 | |
| NL | 8303514 A | 5/1985 | |
| WO | 2005054694 A1 | 6/2005 | |

\* cited by examiner

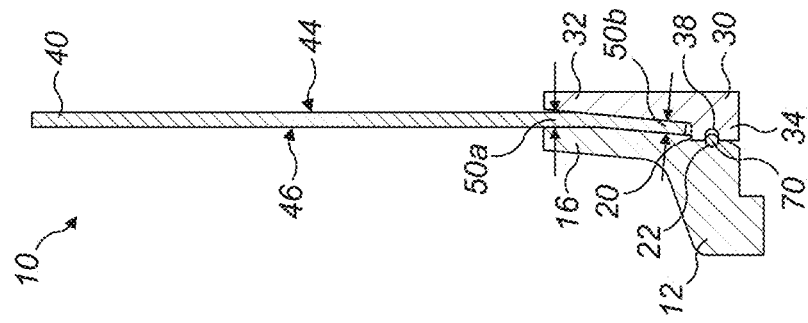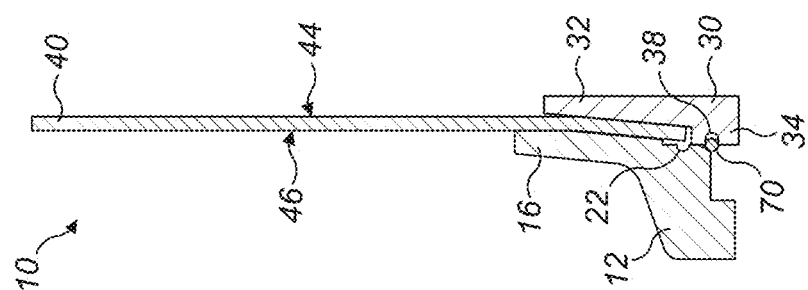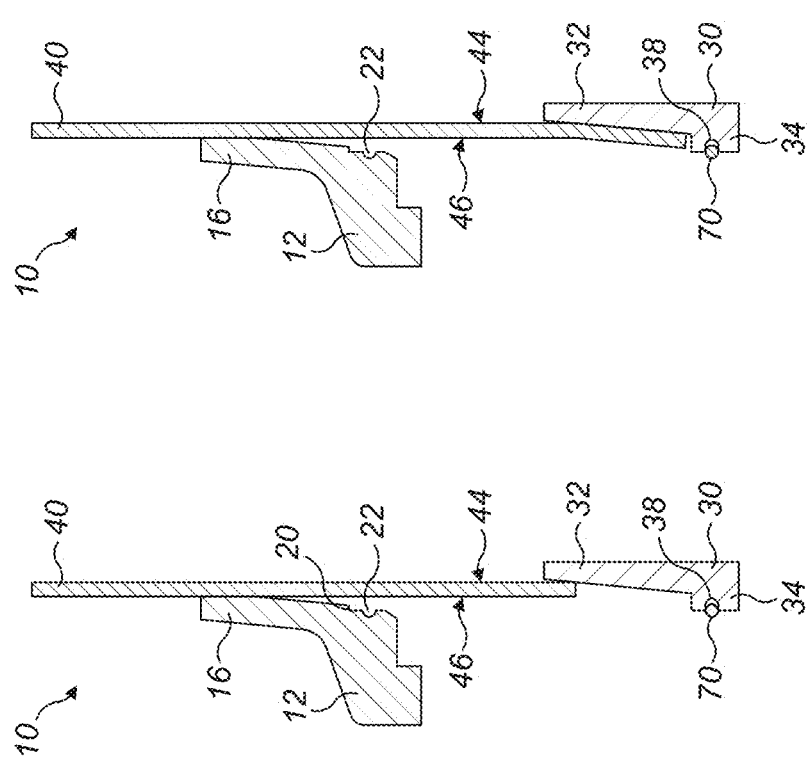

APPARATUS FOR DUCT CONNECTION

FOREIGN PRIORITY

This application claims priority to European Patent Application No. 19461510.0 filed Feb. 1, 2019, the entire contents of which is incorporated herein by reference.

The present disclosure relates to an apparatus for connecting to the end of a duct and a method of attaching an apparatus to the end of a duct.

BACKGROUND

It is desirable to connect ducts to one another or to other parts. Fiber-reinforced composite materials and metal matrix composites are increasingly used to make lightweight parts, such as ducts and thus it is desirable to use these in order to reduce weight in various applications. However, these materials often have poor properties for joining to other parts. For example, some composites do not form good bonds with commonly used adhesives. Other composites experience significant reductions in performance when holes (e.g. to receive a bolt) are drilled/formed in the composite, often due to the holes acting as stress concentrators. Thus, there is a need to improve the joining between a lightweight duct and other, e.g. metal, parts.

U.S. Pat. No. 4,715,739 discloses a connection between a fiber-reinforced plastics power transmission shaft and a metal input fitting. The metal input fitting comprises an axially extending inner ring that has a radially extending flange extending from one axial end of the inner ring. The shaft is placed over the inner ring such that the outer surface of the inner ring abuts the inner surface of the shaft. A metal outer ring is then heated and slid over the outer surface of the shaft until it comes to a common axial position with the inner ring. The outer ring is then cooled so as to shrink it into an interference fit with the outer surface of the shaft. In one embodiment, the outer ring is then welded to the flange of the inner ring.

Such conventional joining means have generally been considered satisfactory for their intended purpose but improvements are nonetheless desirable.

SUMMARY

An apparatus for connecting to the end of a duct is described herein, the apparatus comprising: an outer ring having a central axis and an inner surface extending between a first axial end and a second axial end of the outer ring. The apparatus also comprises an inner ring positioned within said outer ring and having said central axis and an outer surface extending between a first and second axial end of said inner ring. The inner and outer rings are shaped and sized relative to each other so as to provide a gap between said outer surface of said inner ring at its first end and said inner surface of said outer ring at its first end. The gap extends in the direction of said second ends of the inner and outer rings. At the first ends, the gap is configured to receive said duct. The gap also decreases in width as it extends away from said first ends and in the direction of said second ends. The apparatus further comprises an axial positioning means provided at said second ends of said outer and inner rings, that is configured to retain said inner and outer rings in a fixed axial position relative to each other.

In some examples described herein, the inner surface of said outer ring abuts said outer surface of said inner ring at said second ends of said outer and inner rings.

In some examples described herein, the inner ring comprises an axially extending portion that is conical, such that an outer diameter of the conically extending portion increases as it extends from said first end of the inner ring in the direction of said second end of said inner ring.

In some examples described herein, the axial positioning means comprises a lip provided in the inner surface of said outer ring at its second end and a flange provided on said outer surface of said inner ring at its second end and wherein said lip is configured to abut said flange to thereby prevent the inner ring from moving axially past the lip.

In some examples described herein, said axial positioning means comprises a groove being provided on said outer surface of said inner ring and a groove provided on said inner surface of said outer ring, and further comprising a snap ring configure to sit in and between said grooves to thereby hold the rings in said fixed axial position relative to one another.

In some examples described herein, said inner ring comprises a flange provided on its outer surface at its second end and wherein said groove is provided in said flange.

In some examples described herein, said axial positioning means comprises said outer ring being sized relative to said inner ring so as to form an interference fit around the inner ring.

A system is also described herein that comprises both the apparatus described above as well as a second apparatus having similar or identical features to the first apparatus. For example, the second apparatus may comprise a second outer ring having said central axis and an inner surface extending between a first axial end and a second axial end of the outer ring; and a second inner ring positioned within said second outer ring and having said central axis and an outer surface extending between a first and second axial end of said second inner ring. As in the example of the first apparatus, a gap may also be provided between said outer surface of said second inner ring at its first end and said inner surface of said second outer ring at its first end, said gap extending in the direction of said second ends of the second inner and outer rings; said gap at said first ends being configured to receive a second duct. In some examples, both said first and second apparatus may each comprise a correspondingly shaped and sized mating region at the second end of each of their outer rings, said mating region of said first apparatus being sized and shaped so as to connect to the mating region provided at the second end of the outer ring of the second apparatus, to thereby connect said first apparatus to said second apparatus.

In some examples described herein, each of said first and second apparatus may comprise a flange provided on an outer surface of said outer rings and said system may further comprising means for holding these flanges together in use. In one example, this may comprise a U-shaped coupling ring that is sized to fit over both said flange of said first apparatus and said flange of said second apparatus to thereby hold said first and second apparatus in position relative to each other. In other examples, a different means for holding these flanges together may be envisaged, such as some other form of clamping means.

The disclosure therefore provides examples wherein an apparatus for connecting to the end of a duct comprises an inner ring having a central axis and an axial end, an outer ring having a central axis and an axial end, and means for holding the inner and outer rings relative to each other in a fixed axial position; wherein when the rings are held in the fixed position, a gap for receiving the duct is formed there between, and wherein the gap decreases from a first radial size at the axial end of one of the rings to a second, smaller size at a location axially spaced from the end of that ring.

In some examples described herein, the inner ring may comprise an axially extending portion that is conical, wherein a diameter of the cone measured at the axial end of the inner ring is smaller than a diameter measured away from the axial end.

In some examples described herein, the outer ring may have a lip that is configured to abut a flange of the inner ring to prevent the inner ring from moving axially past the lip.

The inner ring may have an inner ring groove and the outer ring has an outer ring groove, the apparatus further comprising a snap ring that sits in and between the grooves to hold the rings in the fixed axial position relative to one another. In some examples described herein, the inner ring groove is formed in a flange of the inner ring.

In some examples described herein, the outer ring may be sized to form an interference fit over the inner ring when the rings are brought into the fixed axial position, optionally wherein the outer ring is sized such that the outer ring must be heated so as to expand in order to fit over the inner ring and interference fit is formed when the outer ring is cooled.

The apparatus may comprise a mating region for mating with another similar or identical apparatus.

The inner and outer rings may be made of metal, optionally 6061T6 aluminium, 15-5PH stainless steel and/or 17-4PH stainless steel.

The present disclosure also describes a system comprising: the apparatus described above; and a duct, wherein the duct has a wall having a wall thickness, wherein the duct wall is held in the gap between the two rings; optionally wherein the first radial size of the gap is equal to or larger than the wall thickness, and the second radial size is smaller than the wall thickness, such that the duct is held in a friction fit with the two rings.

In some examples described herein, the inner ring may have a conical portion that is sized such that the end of the duct must flare in order to fit over the axially extending portion of the inner ring.

In some examples described herein, the system may further comprise a U-shaped coupling ring sized to fit over a flange of the outer ring, said coupling ring suitable for connecting the apparatus of the system to another, similar, apparatus.

The duct may be made from a fibre reinforced composite material or a metal matrix composite material, optionally wherein the material is one of: polyphenylene sulfide (PPS), polyether-ether-ketone (PEEK), polypropylene (PP), polyamide (PA) filled with fibres selected from the group of: fiberglass, carbon fibers, and silicon carbide fibers, or the material is an aluminium matrix reinforced with carbon fibers.

A method of attaching an apparatus to a duct is also described herein, the duct having an inner surface and an outer surface and extending between a first and second end. The method comprises providing an outer ring having a central axis and an inner surface extending between a first axial end and a second axial end of the outer ring; and providing an inner ring having said central axis and an outer surface extending between a first and second axial end of said inner ring. The method may further comprise placing said outer ring around the outer surface of the duct at said first end of said duct and inserting said first end of said inner ring into said first end of the duct, so that an outer surface of said first end the inner ring abuts the inner surface of said duct. The method may further comprise sliding the outer ring towards the first end of the duct until the second end of said outer ring abuts a portion of the second end of the inner ring. A gap is provided between said outer surface of said inner ring at its first end and said inner surface of said outer ring at its first end, said gap) extending in the direction of said second ends of the inner and outer rings; said gap at said first ends being configured to receive said duct. The gap decreases in width as it extends away from said first ends and in the direction of said second ends. The method may further comprise providing an axial positioning means at said second ends of said outer and inner rings, that is configured to retain said inner and outer rings in a fixed axial position relative to each other.

In some examples described herein, the step of inserting said first end of said inner ring into said first end of said duct comprises pressing the duct over a conical portion of the inner ring such that the duct flares outwards as the inner ring is inserted.

In some examples described herein, the method further comprises heating said outer ring before performing said step of sliding the outer ring towards the first end of the duct.

In some examples described herein, a material for the duct is selected so as to cure in response to the heat from the heated outer ring.

A method of attaching an apparatus to a duct having inner and outer surfaces is also described, the apparatus comprising an inner ring and an outer ring, the method comprising: placing the outer ring onto the outer surface of the duct at a location axially distant from the end of the duct, inserting a portion of the inner ring into an end of the duct, wherein an outer surface of the inner ring abuts a wall of the duct, sliding the outer ring towards the end of the duct until the outer ring abuts a portion of the inner ring and the rings are held in a fixed position relative to one another, wherein when the rings are held in the fixed position, a gap for receiving the duct is formed therebetween, wherein the gap decreases from a first radial size at an axial end of one of the rings to a second, smaller radial size at a location axially spaced from the end of that ring.

The step of inserting a portion of the inner ring into an end of the duct may comprise: pressing the duct over a conical portion of the inner ring such that the duct flares as the inner ring is inserted.

The outer ring may be heated before sliding the outer ring towards the end of the duct, so that the outer ring has a larger internal diameter than when in a cool state, such that an interference fit is formed between the inner and outer rings when the outer ring cools.

A material for the duct may be selected so as to cure in response to the heat from the heated outer ring.

DESCRIPTION OF THE FIGURES

Certain embodiments of the present disclosure will now be described in greater detail by way of example only and with reference to the accompanying drawings in which:

FIGS. 3A-D show the stages of installing the apparatus onto the end of a duct;

DETAILED DESCRIPTION

Figure 1:
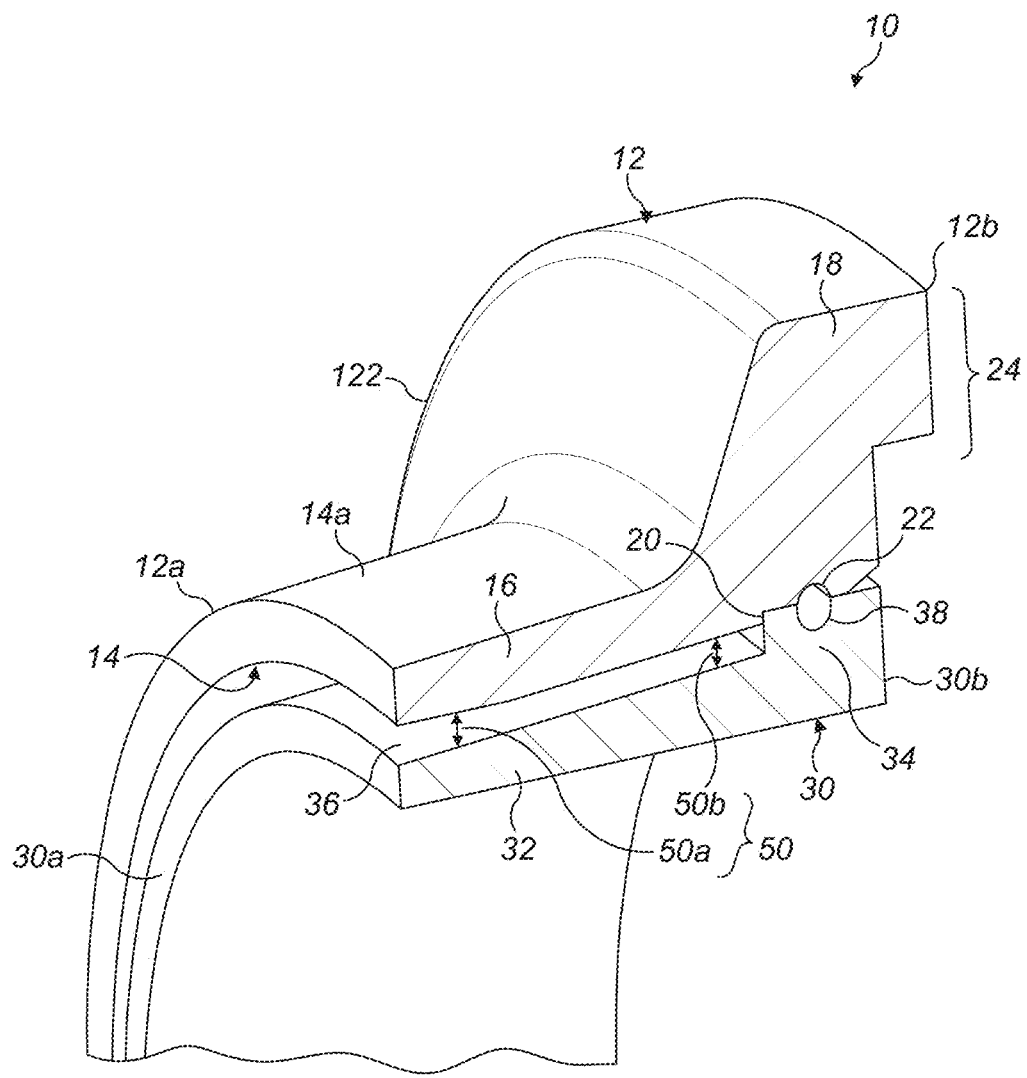
FIG. 1 shows an apparatus for connecting to the end of a duct.

FIG. 1 shows a first apparatus 10 for connecting to the end of a duct. The apparatus 10 comprises an outer ring 12 and an inner ring 30. Each of the rings 12, 30 may have a generally cylindrical geometry. That is, each ring may be generally cylindrically-symmetric around a central axis, C of the ring.

The outer ring 12 has an outer surface 122 and an outer diameter that varies between a first axial end 12a of the outer ring 12 and the second axial end 12b of the outer ring 12. That is, as shown in FIG. 1, the outer ring 12 has an outer surface 122 that is greater at its second axial end 12b than at its first axial end 12a. In the example shown in FIG. 1, this is achieved due to the presence of a first axially extending outer ring portion 16 at its first axial end 12a having a first outer diameter and a second, radially extending outer ring flange 18 located at the second axial end 12b of the ring 12 having a second outer diameter, the second outer diameter being greater than the first outer diameter. The first outer ring portion 16 at the first axial end 12a of the outer ring 12 may have a generally cylindrical inner surface 14 and a generally cylindrical outer surface 14a. As can be seen in FIG. 1, the inner and outer diameters of this section of the outer ring 12 may be generally constant along the axial length of this portion.

The outer ring 12 also has a mating region 24 adjacent the flange 18, i.e. at the second axial end 12b of the ring 12 that is opposite from the axially extending outer ring portion 16 at the first end 12a. As described in greater detail below, in use this mating region 24 may interlock with a correspondingly shaped and sized mating region on another, similar, apparatus such that the two apparatuses may be joined together end-to-end.

The inner ring 30 also has a central axis C which is the same as the outer ring 12 when in use and a first, axially extending, inner ring portion 32 extending from its first axial end 30a and a second, radially extending inner ring portion, or flange 34 at its second axial end 30b. The first inner ring portion 32 has a radially outer surface 36 as shown in FIG. 1.

In use, the inner ring 30 and outer ring 12 are connected together so as to hold a duct between the axially extending portions 16, 32 of the two rings. Multiple different means for connecting the rings 12, 30 together are disclosed herein.

In the example shown in FIG. 1, a groove 38 is formed on the outer surface 36 of the inner ring 30. In the example shown in FIG. 1, this groove 38 is formed so as to extend circumferentially upon the outer surface 36 and around the inner ring flange 34 (i.e. both the flange and the groove extend circumferentially around the outer surface 36 of the inner ring 30). In such an example, a corresponding circumferential groove 22 may also be formed to extend circumferentially around the inner side of the outer ring 12. The apparatus may be shaped and sized so that in use the groove 22 provided in the inner surface 14 of the outer ring 12 lies in a position that is axially aligned with the flange 34 of the inner ring 30. As described in detail later, in some examples, a snap ring may be disposed so as to lie in the space created by the two grooves 22, 38 to thereby join the inner 30 and outer 12 rings together.

When attached to a duct, the two rings 12, 30 are arranged coaxially such that the inner ring flange 34 and the outer ring flange 18 are generally aligned in the axial direction. As shown in FIG. 1, the inner ring 30 must therefore have a slightly smaller outer diameter than the inner diameter of the outer ring 12. In some examples, in use, the flange 38 of the inner ring 30 may be axially aligned with the flange 18 of the outer ring 12. In other embodiments, including those described below, other means may be used to align the rings 12, 30.

In some examples, the apparatus may comprise an axial positioning means. In the example shown in FIG. 1, this may comprise the outer ring 12 also having an axially extending ledge or lip 20 defined at its second end and formed on its inner surface 14 and this being used in combination with the flange 34 of the inner ring 30. The grooves 22, 38 are positioned relative to the lip or ledge 20 and the flange 34 of the inner ring so that when the two rings 12, 30 are attached to a duct, the inner surface of the lip 20 abuts the outer surface of the inner ring flange 34 to thereby provide the axial positioning of the two rings 12, 30 relative to each other. In this way, when the inner surface of the lip or ledge 20 abuts the outer surface of the inner ring flange 34, the two grooves 22, 38 are correctly aligned.

When the two rings 12, 30 are aligned, one inside the other, a gap 50 is defined between the inner surface 14 of the outer ring 12 and the outer surface 36 of the inner ring 30. Rings 12, 30 are shaped such that the gap 50 is larger 50a at the first axial end of one (or both) of the rings 12, 30, i.e. at the end that is opposite the rings' flanges 18, 34. The gap also becomes smaller 50b in the direction of the rings' flanges 18, 34. As described in detail below, in this way, in use, the duct fits into the gap 50 and is held by a friction fit between the two rings 12, 30.

Figure 2:
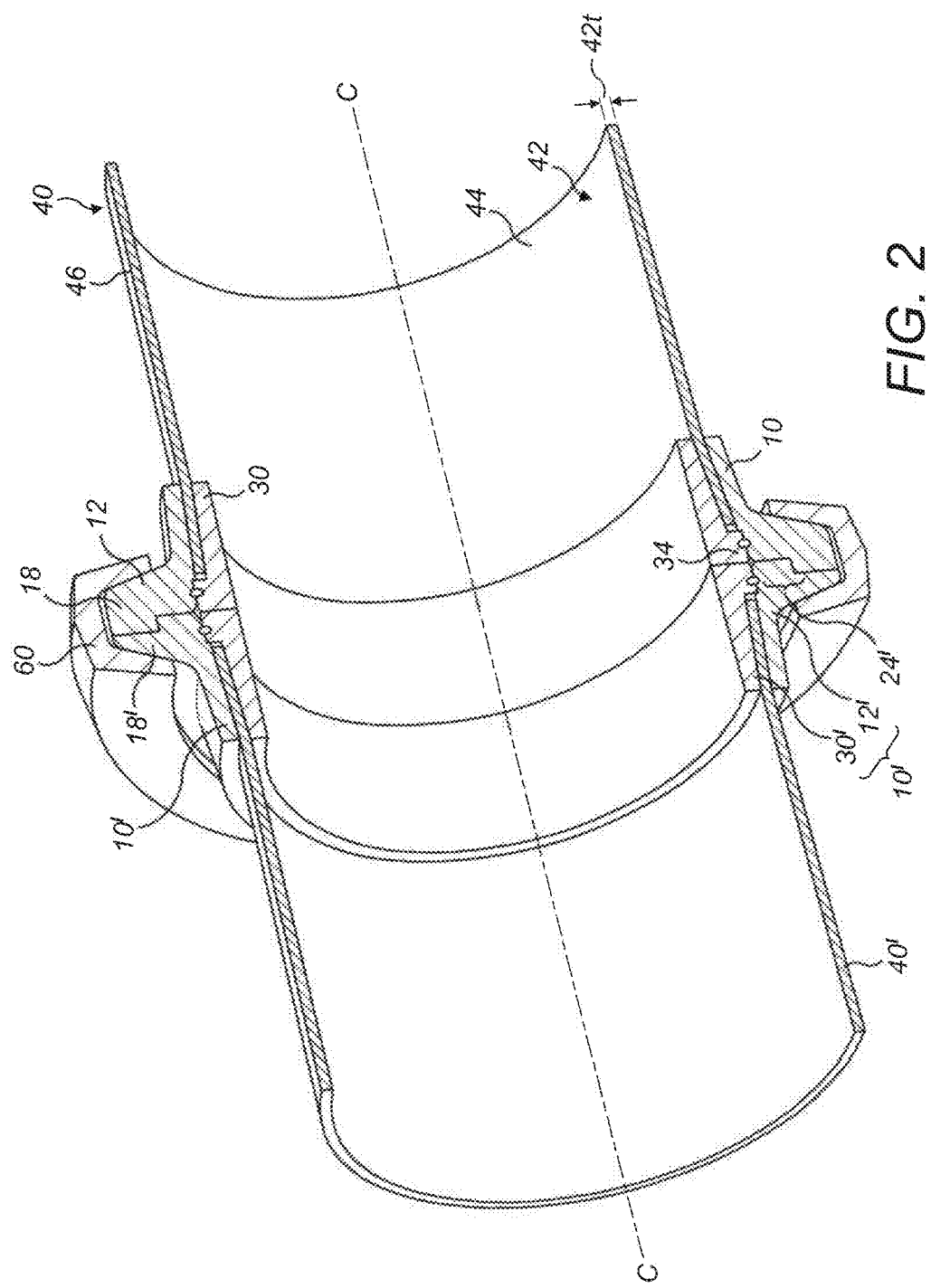
FIG. 2 shows two sections of duct connected together by a pair of the apparatuses of FIG. 1.

FIG. 2 shows the two rings 12, 30 of FIG. 1 holding a duct 40. The duct 40 has a wall 42 having a wall thickness 42t. The rings 12, 30 are sized such that the duct may be inserted between the inner and outer rings at their first ends. That is, the duct may be inserted between the rings at the end wherein the gap 50a is larger than the gap nearer to the flanges. In some examples, the gap 50a at this first end 12a may therefore be equal to or greater than the wall thickness 42t. Further, the rings 12, 30 are sized such that the smaller region of gap 50b located nearer the flanges 18, 34 is smaller than the wall thickness 42t. As such, when the rings 12, 30 are installed on the end of the duct 40, the wall 42 is compressed slightly and the duct 40 is held by a friction fit between the two rings 12, 30.

As shown in FIG. 2, in some examples, the apparatus 10 may be used to connect two ducts 40, 40' together end-to-end. In some examples, such as that shown in FIG. 2, the first apparatus 10 may be identical or at least very similar to the second apparatus 10' for receiving the second duct 40'. For this reason, features of the second apparatus 10' that are the same as in the first apparatus 10 are labeled with the same number but dashed ('). In this example, The second duct 40' may be held by a second, similar, apparatus 10' that, like the first apparatus 10, is comprised of an inner ring 30' and an outer ring 12'. Inner ring 30' and outer ring 12' may be essentially identical to the inner 12 and outer rings 30 of the first apparatus 10 as discussed above. However, the mating region 24' of the second apparatus 10' may be correspondingly shaped such that the two mating regions 24, 24' can mate with one another.

Once the first apparatus 10 is installed on an end of the first duct 40 and the second apparatus 10' is installed on an end of the second duct 40', then the two ducts 40,40' may be joined together via connection of the apparatuses 10, 10'. To connect the two ducts 40, 40', the flanges 18,18' of the two outer rings 12,12' of the two apparatuses 10, 10' are brought together and mated via the correspondingly shaped mating regions 24, 24'. In addition to this, a coupling means 60 may also be secured and positioned over the two flanges 18, 18' to further hold the two apparatuses 10, 10' in place relative to each other. In some examples, the coupling 60 may be a ring shaped member having a U-shaped cross section, such that the arms of the U-shape fit over the flanges 18, 18' and clamp them together. Alternatively, in other examples, the two outer flanges 18, 18' may be joined together by bolts (not shown) or any other attachment means.

Alternatively, the apparatus 10 may be used to connect the duct 40 to a wall (not shown), in which case the second apparatus 10b is obviously not required.

FIGS. 3A-D show the stages of attaching the apparatus 10 to a duct 40. The following method steps may be used apply substantially identically for other embodiments of the apparatus 10, e.g. those shown in FIGS. 4 and 5.

Firstly, as shown in FIG. 3A, the outer ring 12 is placed around the outer surface of the duct 40. In some examples, this is achieved by inserting the end of the duct that is not being connected into the outer ring 12 and moving the outer ring 12 in the direction of the end of the duct that is to be connected to a second component or duct. The inner ring 30 is also partially inserted into the internal cavity of the duct at its opposite end (i.e. at the end that is to be connected) so that the outer surface 36 of the inner ring 30 abuts an inner surface 44 of the duct wall 42. In this example, a snap ring 70 may be disposed in the groove 38 of the inner ring 30 as described above.

As shown in FIG. 3B, the inner ring 30 is then pressed further into the end of the duct 40 that is to be connected. In some examples, the outer surface 36 of the inner ring 30 may have a slightly conical shape, i.e. a diameter that gets larger near the flange 34, such that the duct 40 is forced to flare outwards slightly to fit over the axially extending inner ring portion 32 of the inner ring 30. Thus, there is an initial friction fit between the inner ring 30 and the duct 40 even before the outer ring 12 is provided around the duct 40. The axially extending portion 16 of the outer ring 12 may also have a generally cylindrical inner surface 14 or the inner surface 14 may be slightly conical (with a different conical angle from the outer surface 36 of the inner ring 30). The different shapes of the outer surface 36 of the inner ring 30 and the inner surface 14 of the outer ring 12 provide the gap 50 described above that changes from a wider region 50a to a smaller region 50b in the direction of both the flanges. Optionally, the width of the gap in the radial direction decreases smoothly and gradually from the wider region 50a to the smaller region 50b, i.e. without any step changes in the width of the gap 50. In other examples, the width of the gap 50 between the rings 12, 30 may be stepped.

As shown in FIG. 3C, the outer ring 12 is then slid down the outer surface 46 the duct 40 towards the inner ring 30 until the two rings 12, 30 come nearly to a common axial position. As the rings 12, 30 come into alignment with one another, the wall 42 of the duct 40 is compressed between the axially extending portions 16, 32 of the two rings 12, 30.

As shown in FIG. 3C, the outer ring 12 is slid down further until the lip 20 of the outer ring 12 abuts the flange 34 of the inner ring 30. At this point, the snap ring 70 snaps into the groove 22 of the outer ring 12. The snap ring 70 thus sits in and between both grooves 22, 38 and thereby holds the two rings 12, 30 at this fixed axial position.

Figure 4:
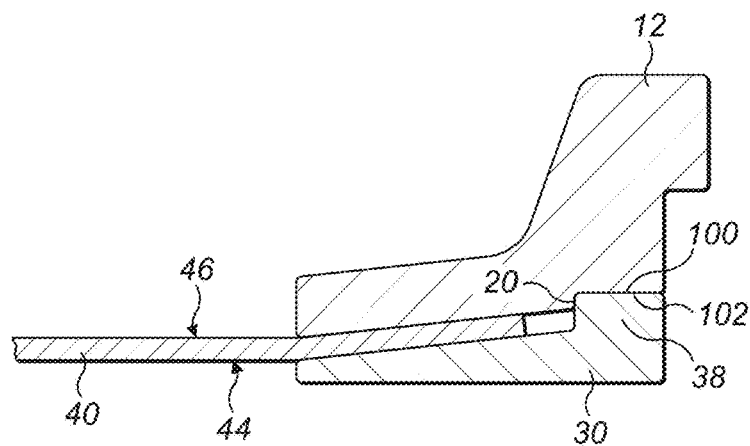
FIG. 4 shows an alternative means for connecting the rings of the apparatus together.
Figure 5:
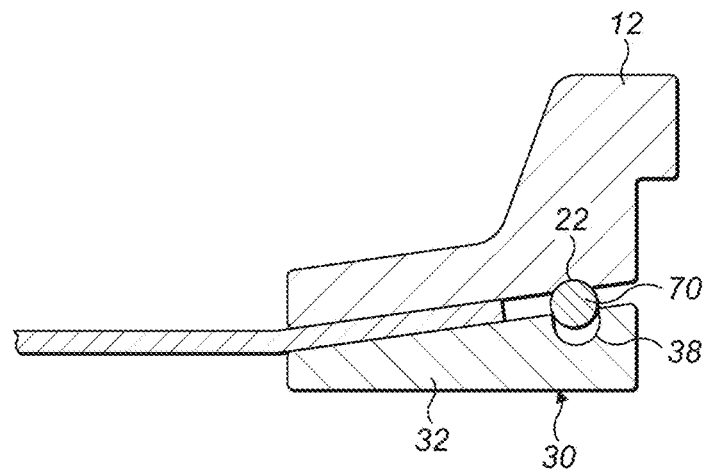
FIG. 5 shows another alternative means for connecting the rings of the apparatus together.

FIGS. 4 and 5 show alternative axial positioning means by which the two rings 12, 30 may be held at the desired fixed axial position when installed on a duct 40.

The outer ring 12 shown in FIG. 4 has previously been heated, causing it to expand enough to fit over the flange 38 of the inner ring 30, and then cooled. Upon cooling, the outer ring 12 shrinks into a friction fit (also commonly called "an interference fit") with the inner ring 18. In this example, there is no need for the grooves 22, 38 or snap ring 70. Instead, a section, or land 100 of the outer ring 12 is in friction fit with a section, or land 102 of the inner ring 30.

In this embodiment, proper axial alignment between the rings may be ensured by the ledge or lip 22 abutting a surface of the flange 38 of the inner ring 30. In other respects, the connection of this embodiment of the apparatus 10 to a duct, having an inner 44 and outer 46 surface, is the same as described above with relation to FIGS. 3A-D.

In examples where the duct 40 is made from a thermoplastic, the heat from the second ring 12 may improve the bonding between the outer ring and duct 40.

In FIG. 5, the inner ring 30 does not have a flange and the outer ring 12 does not have a lip. Instead, the groove 38 of the inner ring 30 is formed directly in the outer surface of the axially extending portion 16, the groove being for receiving a snap ring 70. The outer ring 12 has a groove 22 for receiving the snap ring 70. In this example, axial alignment between the rings 12, 30 is ensured by the snap ring fitting into the two grooves 22, 38.

Figure 6:
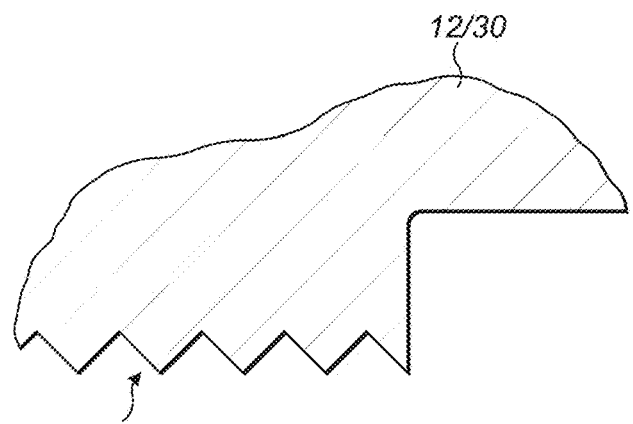
FIG. 6 shows a serrated edge.

FIG. 6 shows an edge having serrations 80. Either or both of the outer ring 12 or the inner ring 30 may have serrations 80 as shown in FIG. 6. In use, when these serrations are provided on the inner surface 14 of the outer ring 12 and the outer surface 36 of the inner ring 12, these serrations 80 dig in to the inner and outer surfaces of the duct wall 44 to increase the strength of the connection between the rings 12, 30 and duct 40. Other shapes of serration are also envisaged, such as saw tooth serrations or rounded serrations.

In other embodiments, not shown, the outer ring 12 may not have a flange. In these cases, the outer ring may connect to another piece (e.g. another similar apparatus 10) by other means, including but not limited to: a screw-thread on the outer surface of the outer ring 12, a bolt, or splines on the outer surface.

The duct 40 may be made of a lightweight material. Exemplary lightweight materials include fiber reinforced composites (FRC) and metal matrix composites (MMC). For example, the duct 40 may be wholly or partially made from thermoplastic polymers such as polyphenylene sulfide (PPS), polyether-ether-ketone (PEEK), polypropylene (PP), polyamide (PA) filled with fibers selected from the group of: fiberglass, carbon fibers, and silicon carbide fibers.

Alternatively, the duct 40 may be made from a metal matrix composite, such as an aluminium matrix reinforced with carbon fibers. For thermosets polymers it is possible to heat up the apparatus 10 and duct 40 after fitting these together, to cure (or finish curing) the thermoset material.

The apparatus 10 described herein may provide a strong connection to a RFC or MMC duct while also providing a durable and functional means for connecting the duct 40 to another piece.

The apparatus 10 may be made from metal. For example, the rings 12, 30 may be made from 6061T6 aluminium, 15-5PH stainless steel and/or 17-4PH stainless steel.

The apparatus 10 makes use of an interference fit (e.g. as opposed to a chemical bond or pin-type connections such as rivets or bolts), and so a wide range of dissimilar materials may be used for the duct 40 and apparatus 10. As such, use of the apparatus 10 may allow use of lighter-weight materials than previously.

The invention claimed is:

1. An apparatus for connecting to the end of a duct, the apparatus comprising:
    an outer ring having a central axis (C) and an inner surface extending between a first axial end and a second axial end of the outer ring;
    an inner ring positioned within said outer ring and having said central axis and an outer surface extending between a first and second axial end of said inner ring, wherein a gap is provided between said outer surface of said inner ring at its first end and said inner surface of said outer ring at its first end, said gap extending in the direction of said second ends of the inner and outer rings;

wherein said gap at said first ends being configured to receive said duct; and wherein said gap decreases in width as it extends away from said first ends and in the direction of said second ends;

wherein said inner ring has a conical profile starting from said first end of said inner ring, and said outer ring has a conical profile starting from said first end of said outer ring;

wherein an outer diameter of said outer surface of said inner ring increases from said first axial end of said inner ring towards said second axial end of said inner ring, and wherein an inner diameter of said inner surface of said outer ring increases from said first axial end of the outer ring towards said second axial end of said outer ring;

wherein a conical angle of the conical profile of the outer ring is different from a conical angle of the conical profile of the inner ring;

wherein said apparatus comprises an axial positioning means provided at said second ends of said outer and inner rings, that is configured to retain said inner and outer rings in a fixed axial position relative to each other; wherein said axial positioning means comprises a groove being provided on said outer surface of said inner ring and a groove provided on said inner surface of said outer ring, and further comprising: a snap ring configure to sit in and between said grooves to thereby hold the rings in said fixed axial position relative to one another; wherein said inner ring comprises a flange provided on its outer surface at its second end and wherein said groove is provided in said flange.

2. The apparatus of claim 1 wherein said inner surface of said outer ring abuts said outer surface of said inner ring at said second ends of said outer and inner rings.

3. The apparatus of claim 1, wherein said axial positioning means comprises a lip provided in the inner surface of said outer ring at its second end and a flange provided on said outer surface of said inner ring at its second end and wherein said lip is configured to abut said flange to thereby prevent the inner ring from moving axially past the lip.

4. A system comprising
the apparatus of claim 1;
a second apparatus comprising a second outer ring having said central axis (C) and an inner surface extending between a first axial end and a second axial end of the outer ring; and
a second inner ring positioned within said second outer ring and having said central axis (C) and an outer surface extending between a first and second axial end of said second inner ring,
wherein a gap is provided between said outer surface of said second inner ring at its first end and said inner surface of said second outer ring at its first end, said gap extending in the direction of said second ends of the second inner and outer rings; said gap at said first ends being configured to receive a second duct; and wherein both said first and second apparatus each comprise a correspondingly shaped and sized mating region at the second end of each of their outer rings, said mating region of said first apparatus being sized and shaped so as to connect to the mating region provided at the second end of the outer ring of the second apparatus, to thereby connect said first apparatus to said second apparatus.

5. The system of claim 4, wherein each of said first and second apparatus comprise a flange provided on an outer surface of said outer rings and said system further comprising a U-shaped coupling ring that is sized to fit over both said flange of said first apparatus and said flange of said second apparatus to thereby hold said first and second apparatus in position relative to each other.

* * * * *